(12) United States Patent
Mori et al.

(10) Patent No.: US 11,370,112 B2
(45) Date of Patent: Jun. 28, 2022

(54) ASSEMBLY APPARATUS AND STRUCTURE FABRICATING METHOD

(71) Applicant: KYOCERA Document Solutions Inc., Osaka (JP)

(72) Inventors: Hayato Mori, Osaka (JP); Tomohiko Yamakawa, Osaka (JP); Koji Izumi, Osaka (JP); Masaru Takagi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 485 days.

(21) Appl. No.: 16/654,937

(22) Filed: Oct. 16, 2019

(65) Prior Publication Data

US 2020/0122322 A1   Apr. 23, 2020

(30) Foreign Application Priority Data

Oct. 17, 2018   (JP) .............................. JP2018-195995

(51) Int. Cl.
*B25J 9/16*   (2006.01)
*B23P 19/02*   (2006.01)
(Continued)

(52) U.S. Cl.
CPC .............. *B25J 9/1612* (2013.01); *B23P 19/02* (2013.01); *B25J 9/1679* (2013.01); *B25J 11/005* (2013.01); *B23P 19/10* (2013.01)

(58) Field of Classification Search
CPC ...... B25J 9/1612; B25J 9/1679; B25J 9/1687; B25J 11/005; B23P 19/02; B23P 19/10
See application file for complete search history.

(56) References Cited

U.S. PATENT DOCUMENTS

2008/0312769 A1* 12/2008 Sato ...................... B25J 9/1687
901/31
2013/0197696 A1* 8/2013 Nammoto .............. B25J 9/1612
700/258
(Continued)

FOREIGN PATENT DOCUMENTS

JP   H07241733 A   9/1995
JP   2005-001081 A   1/2005
(Continued)

OTHER PUBLICATIONS

The extended European search report issued by the European Patent Office dated Mar. 23, 2020, which corresponds to European Patent Application No. 19203767.9-1016 and is related to U.S. Appl. No. 16/654,937.
(Continued)

*Primary Examiner* — Jermie E Cozart
(74) *Attorney, Agent, or Firm* — Studebaker & Brackett PC

(57) ABSTRACT

An assembly apparatus is for assembling a first member and a second member. The assembly apparatus includes a first gripping section, a second gripping section, and a driving section. The first gripping section includes a contact member and an elastic member. The second gripping section includes a contact member and an elastic member. The driving section drives the first and second gripping sections. The driving section drives the first and second gripping sections such that the contact member of the first gripping section and the contact member of the second gripping section make contact with the second member. The first and second gripping sections grip the second member through the two elastic members urging the respective contact members. The driving section drives the first and second gripping sections
(Continued)

such that the first member and the second member are assembled.

10 Claims, 13 Drawing Sheets

(51) Int. Cl.
 *B25J 11/00* (2006.01)
 *B23P 19/10* (2006.01)

(56) References Cited

U.S. PATENT DOCUMENTS

2013/0310980 A1* 11/2013 Matsuoka ............ B25J 15/0023
 700/260
2015/0251321 A1* 9/2015 Ishikawa ................ B25J 9/1612
 294/183
2016/0339588 A1* 11/2016 Ochiishi ................ B25J 9/1694

FOREIGN PATENT DOCUMENTS

| JP | 2015-196208 A | 11/2015 |
| JP | 2018-144214 A | 9/2018 |
| JP | 6400321 B2 | 10/2018 |

OTHER PUBLICATIONS

An Office Action mailed by China National Intellectual Property Administration dated Mar. 11, 2021, which corresponds to Chinese Patent Application No. 201910971979.X and is related to U.S. Appl. No. 16/654,937; with English language translation.

* cited by examiner

ASSEMBLY APPARATUS AND STRUCTURE FABRICATING METHOD

INCORPORATION BY REFERENCE

The present application claims priority under 35 U.S.C. § 119 to Japanese Patent Application No. 2018-195995, filed on Oct. 17, 2018. The contents of this application are incorporated herein by reference in their entirety.

BACKGROUND

The present disclosure relates to an assembly apparatus and a structure fabricating method.

An assembly apparatus includes a force sensor for correcting positional shift.

SUMMARY

An assembly apparatus according to an aspect of the present disclosure is for assembling a first member and a second member. The assembly apparatus includes a first gripping section, a second gripping section, and a driving section. The first gripping section includes a first contact member and a first elastic member. The second gripping section includes a second contact member and a second elastic member. The driving section drives the first gripping section and the second gripping section. The driving section drives the first gripping section and the second gripping section such that the first contact member and the second contact member make contact with the second member. The first gripping section and the second gripping section grip the second member through the first elastic member urging the first contact member and the second elastic member urging the second contact member. The driving section drives the first gripping section and the second gripping section such that the first member and the second member are assembled.

An assembly apparatus according to another aspect of the present disclosure is for assembling a plurality of members including a first member and a second member. The assembly apparatus includes a first gripping section, a second gripping section, and a driving section. The first gripping section includes a first contact member. The second gripping section includes a second contact member. The driving section drives the first gripping section and the second gripping section. The first gripping section and the second gripping section grip the second member through the driving section driving the first gripping section and the second gripping section such that the first contact member and the second contact member make contact with the second member. The first gripping section and the second gripping section grip the first member. The driving section drives the first gripping section and the second gripping section such that the first member and the second member are assembled.

A structure fabricating method according to an aspect of the present disclosure is a method through which a structure is fabricated by assembling a first member and a second member. The method includes making contact, gripping, and moving. In the making contact, a first contact member and a second contact member make contact with the second member through driving of a first gripping section and a second gripping section. The first gripping section includes the first contact member and a first elastic member. The second gripping section includes the second contact member and a second elastic member. In the gripping, the first gripping section and the second gripping section grip the second member through the first elastic member urging the first contact member and the second elastic member urging the second contact member. In the moving, the first gripping section and the second gripping section are moved such that the first member and the second member are assembled.

DETAILED DESCRIPTION

Figure 1:
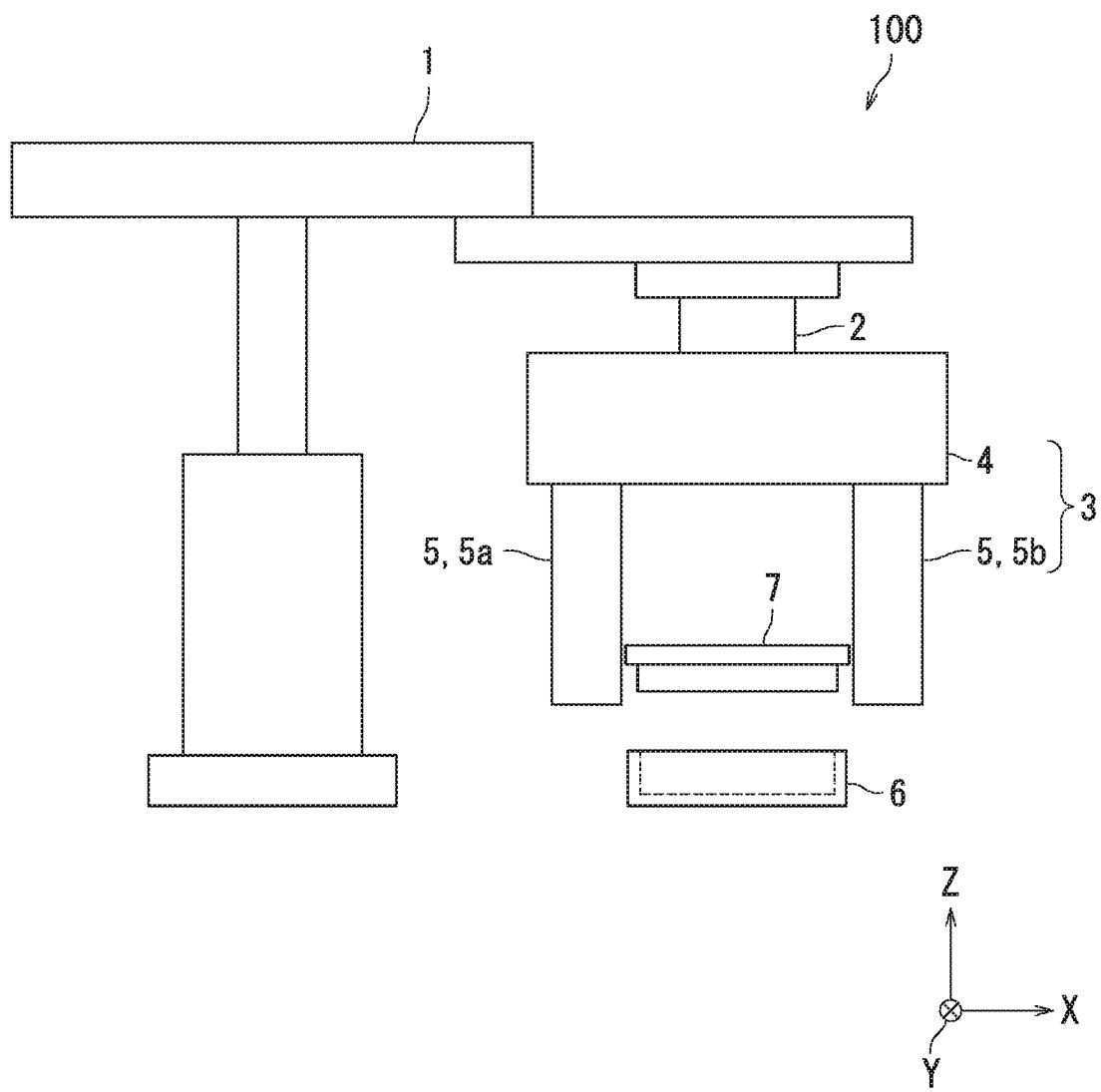
FIG. 1 is a diagram illustrating an example of an assembly apparatus according to an embodiment of the present disclosure.

The following describes an embodiment of the present disclosure with reference to FIGS. 1 to 14. For convenience, a left-to-right direction is defined as a positive X-axis direction, a front-to-back direction is defined as a positive Y-axis direction, and a bottom-to-top direction is defined as a positive Z-axis direction on the sheet surface of FIG. 1. Elements that are the same or equivalent are labeled with the same reference signs in the drawings and description thereof is not repeated.

First, an assembly apparatus 100 according to the embodiment is described with reference to FIG. 1. FIG. 1 is a diagram illustrating an example of the assembly apparatus 100 according to the embodiment.

As illustrated in FIG. 1, the assembly apparatus 100 is an apparatus which fits a male second connector 7 into a female first connector 6 to install the second connector 7 in the first connector 6. The assembly apparatus 100 includes a robot 1, a positional shift correcting device 2, and a gripping mechanism 3. The first connector 6 is equivalent to an example of a "first member" and the second connector 7 is equivalent to an example of a "second member".

The robot 1 causes the gripping mechanism 3 to move relative to the second connector 7, and causes the gripping mechanism 3 to move relative to the first connector 6.

The gripping mechanism 3 includes a driving section 4, a first gripping section 5a, and a second gripping section 5b.

In the following description, the first gripping section 5a and the second gripping section 5b may be collectively referred to as a gripping section 5.

The driving section 4 drives the gripping section 5 to adjust an interval between the first gripping section 5a and the second gripping section 5b. After gripping the second connector 7, the gripping section 5 grips the first connector 6 while gripping the second connector 7.

The positional shift correcting device 2 detects a direction of force acting on the second connector 7 when the second connector 7 is fitted to the first connector 6 and corrects positional shift of the second connector 7 according to the direction of the acting force.

Figure 2:
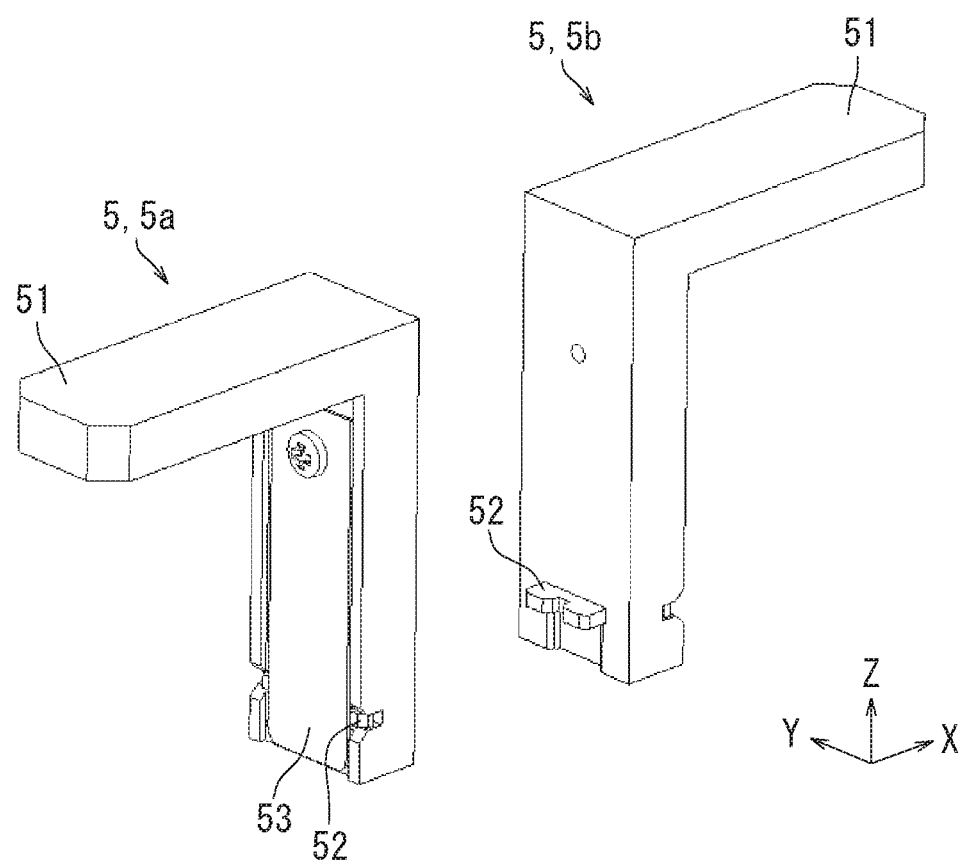
FIG. 2 is a perspective view of a first gripping section and a second gripping section.
Figure 3:
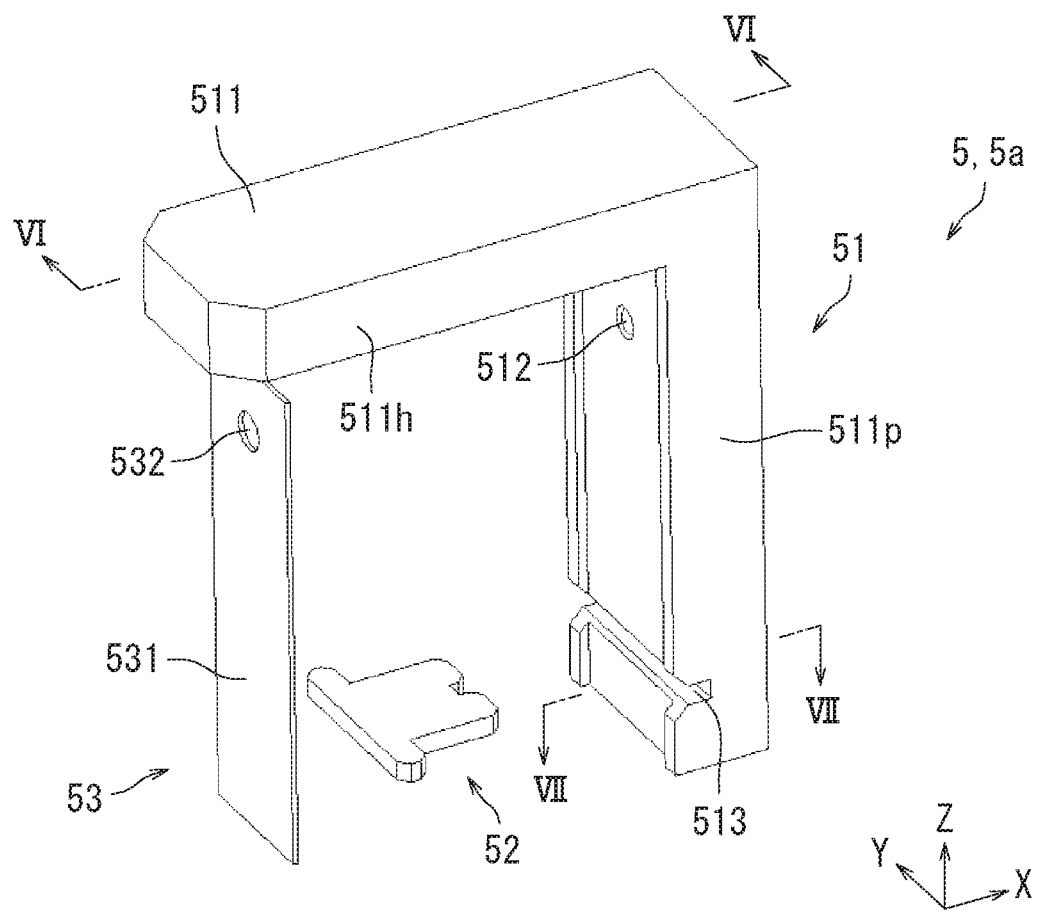
FIG. 3 is an exploded perspective view of the first gripping section.
Figure 4:
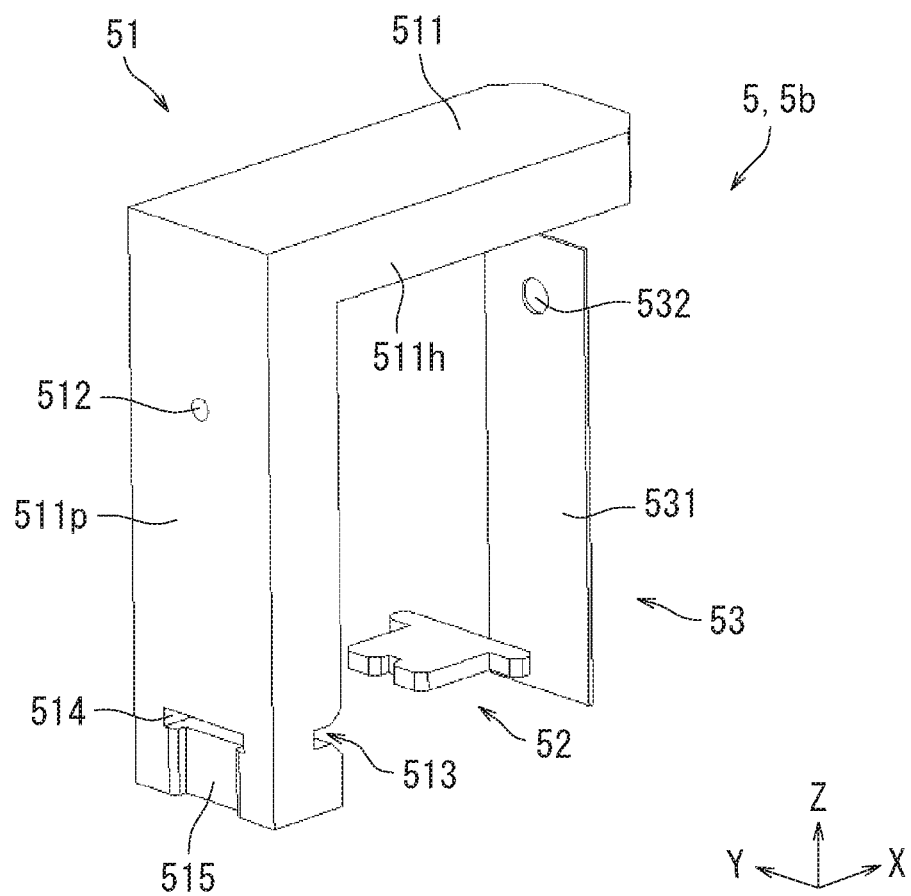
FIG. 4 is an exploded perspective view of the second gripping section.

Next, the gripping section 5 according to the embodiment is described with reference to FIGS. 2 to 4. FIG. 2 is a perspective view of the gripping section 5. FIG. 3 is an exploded perspective view of the first gripping section 5a. FIG. 4 is an exploded perspective view of the second gripping section 5b.

As illustrated in FIG. 2, the first gripping section 5a and the second gripping section 5b each include a support member 51, a contact member 52, and an elastic member 53. The first gripping section 5a and the second gripping section 5b have the same shape and structure as each other.

As illustrated in FIGS. 3 and 4, each of the support members 51 has an L-shaped main body 511. The L-shaped main body 511 has a horizontal portion 511h extending in the X-axis direction and a perpendicular portion 511p intersecting with the horizontal portion 511h and extending in the Z-axis direction. The horizontal portion 511h is driven by the driving section 4.

The perpendicular portion 511p of one of the L-shaped main bodies 511 and the perpendicular portion 511p of the other L-shaped main body 511 are located opposite to each other in the X-axis direction. As illustrated in FIG. 3, a screw hole 512 and a cutout portion 513 are provided in the outer surface of each of the two perpendicular portions 511p. The screw hole 512 is in a position near a part of the perpendicular portion 551p connecting with a horizontal portion 511h. The cutout portion 513 is in a position far from the connecting part. The screw hole 512 is used when fixing the elastic member 53. As illustrated in FIG. 4, a through hole 514 and a contact portion 515 are provided on an end in the negative Z-axis direction on the inner surface of each of the two perpendicular portions 511p. The through hole 514 has a rectangular shape so as to accept insertion of a contact member 52. The cutout portion 513 communicates with the through hole 514. The contact portion 515 is in the form of as a recess.

The contact member 52 is inserted into the cutout portion 513 from the outer side of a perpendicular portion 511p, reaches the inner surface of the perpendicular portion 511p through the through hole 514, and finally protrudes from the inner surface.

An elastic member 53 has a strip-shaped leaf spring 531 and a through hole 532 provided in an upper portion of the leaf spring 531. The leaf spring 531 is fixed to the outer surface of the perpendicular portion 511p by a screw inserted through the through hole 532 being screwed into the screw hole 512. The leaf spring 531 pushes the contact member 52 toward the inner surface of the perpendicular portion 511p.

Figure 5A:
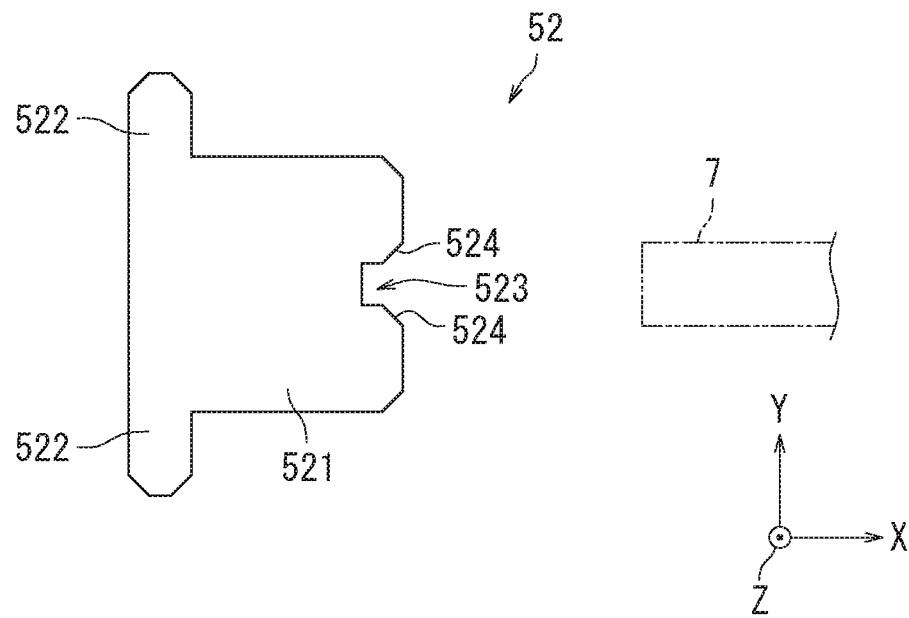
FIGS. 5A and 5B are enlarged plan views of a contact member.

Next, a contact member 52 is described with reference to FIGS. 5A and 5B. FIG. 5A is an enlarged plan view of the contact member 52.

As illustrated in FIG. 5A, the contact member 52 is a plate-shaped member and has a rectangular portion 521, two protrusions 522, and a recess 523. The two protrusions 522 extend outward from opposite ends of a first edge of the rectangular portion 521. The recess 523 is provided in the center of a second edge of the rectangular portion 521. The second edge is parallel to the first edge. Two chamfered portions 524 are provided in the recess 523. The recess 523 accepts insertion of an end of the second connector 7 in a longitudinal direction. The two chamfered portions 524 make contact with the end of the second connector 7 in the longitudinal direction.

Figure 5B:
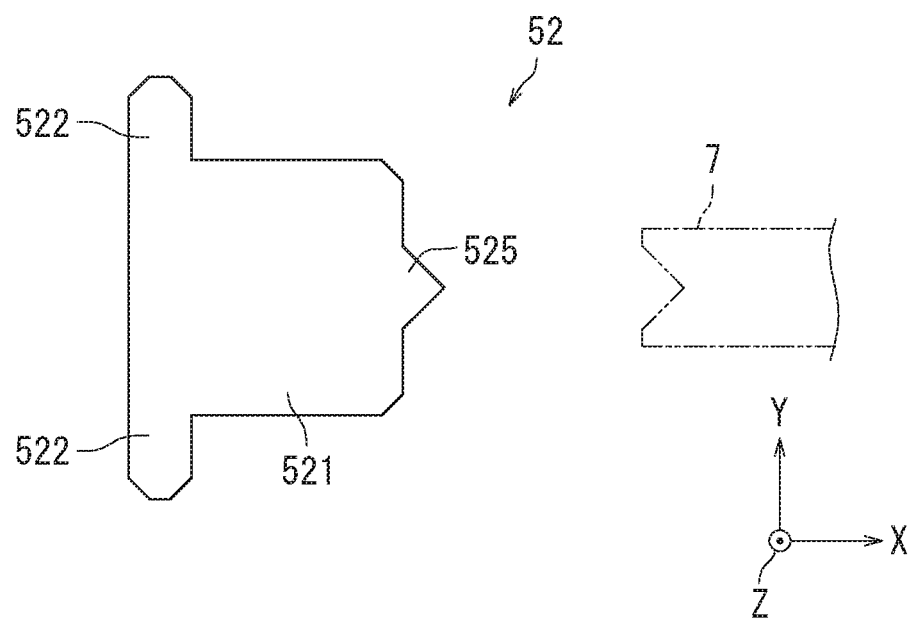

FIG. 5B illustrates a variation of the contact member 52. The contact member 52 of FIG. 5B differs from the contact member 52 of FIG. 5A in having a projection 525 instead of the recess 523. The projection 525 corresponds to a recessed shape of the end of the second connector 7 in the longitudinal direction. The contact member 52 of the first gripping section 5a and the contact member 52 of the second gripping section 5b may have different shapes so as to correspond to the shape of the second connector 7.

Figure 6:
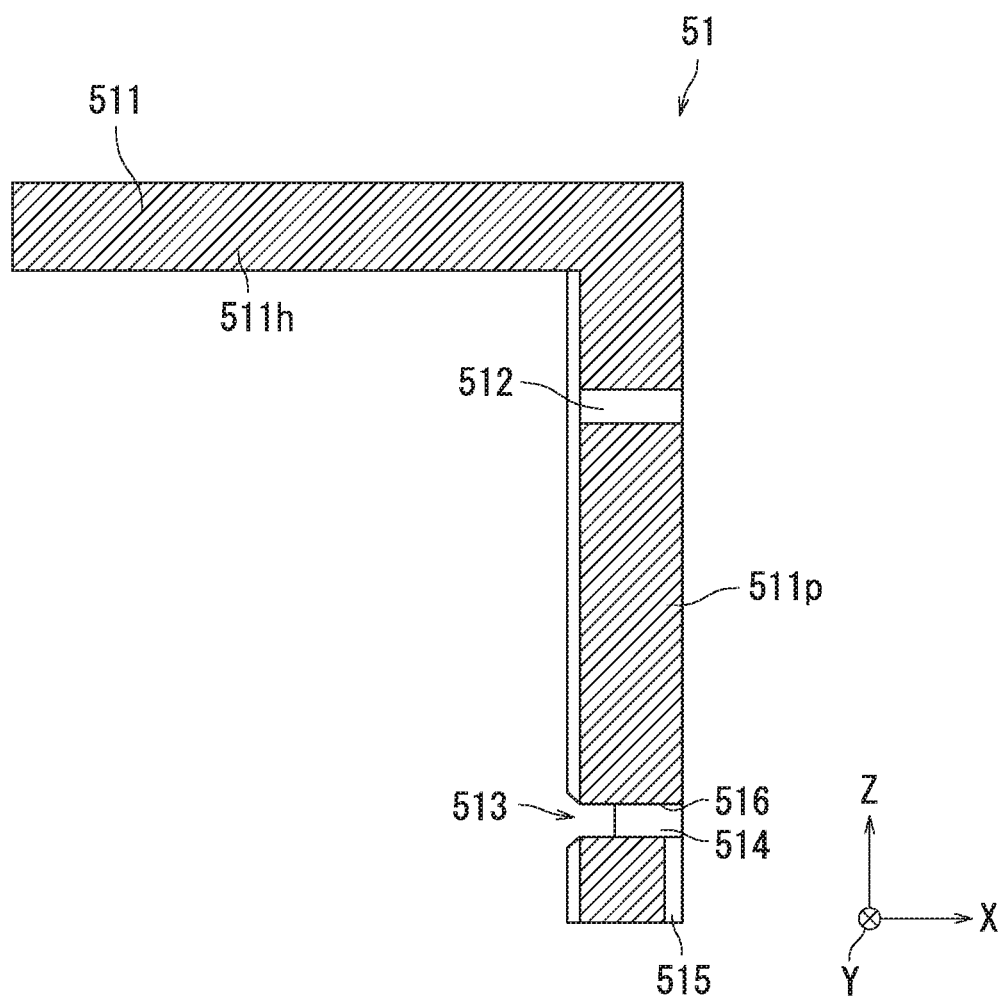
FIG. 6 is a cross-sectional view of a support member taken along a line VI-VI in FIG. 3.
Figure 7:
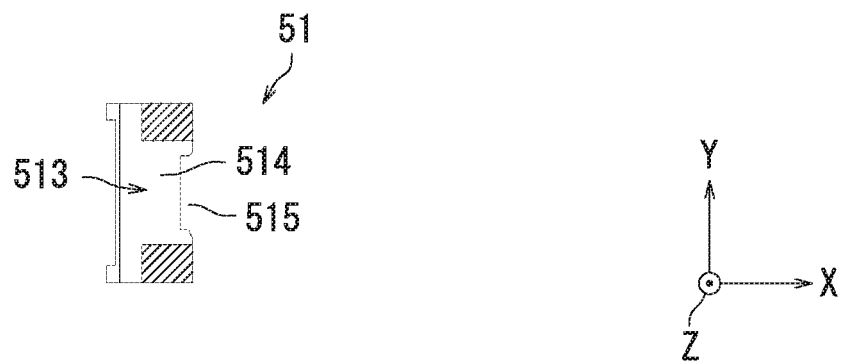
FIG. 7 is a cross-sectional view of the support member taken along a line VII-VII in FIG. 3.

Next, a support member 51 is described with reference to FIGS. 6 and 7. FIG. 6 is a cross-sectional view of the support member 51 taken along a line VI-VI in FIG. 3. FIG. 7 is a cross-sectional view of the support member 51 taken along a line VII-VII in FIG. 3.

As illustrated in FIG. 6, the through hole 514 communicates with the contact portion 515 in the inner surface of the perpendicular portion 511p. The thickness (length in the X-axis direction) of the perpendicular portion 511p in a part above the through hole 514 is greater than the thickness (length in the X-axis direction) of the perpendicular portion 511p in a part below the through hole 514. The difference in thickness of the perpendicular portion 511p forms a stepped portion which functions as a stopper 516 which restricts the second connector 7 from sliding in the positive Z-axis direction. The stopper 516 is equivalent to an example of a "restricting portion".

As illustrated in FIG. 7, the through hole 514 communicates with the wide cutout portion 513 in the outer surface of the perpendicular portion 511p. The cutout portion 513 inhibits escape of the contact member 52 from the inner surface of the perpendicular portion 511p by accepting insertion of the protrusion 522 of the contact member 52.

Next, operation of the assembly apparatus 100 is described with reference to FIGS. 8 to 13.

Figure 8:
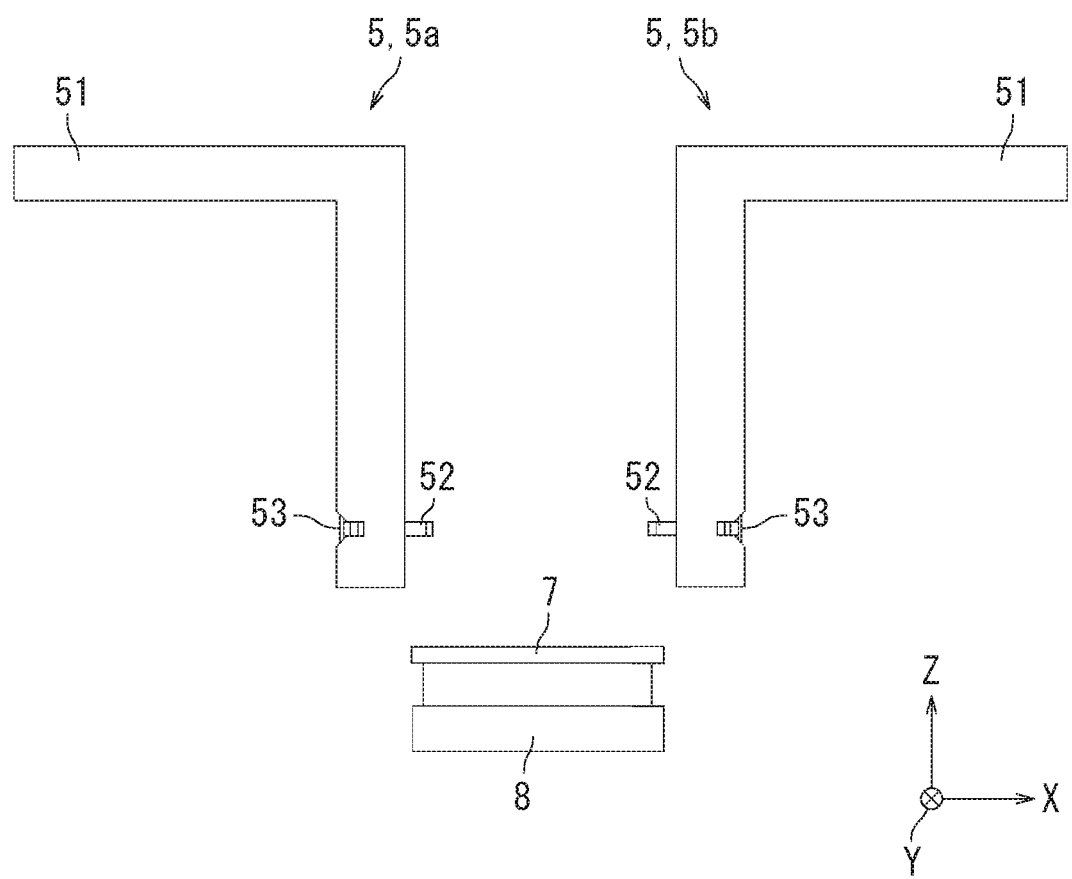
FIG. 8 is a front view for describing a process of gripping a second connector.
Figure 9:
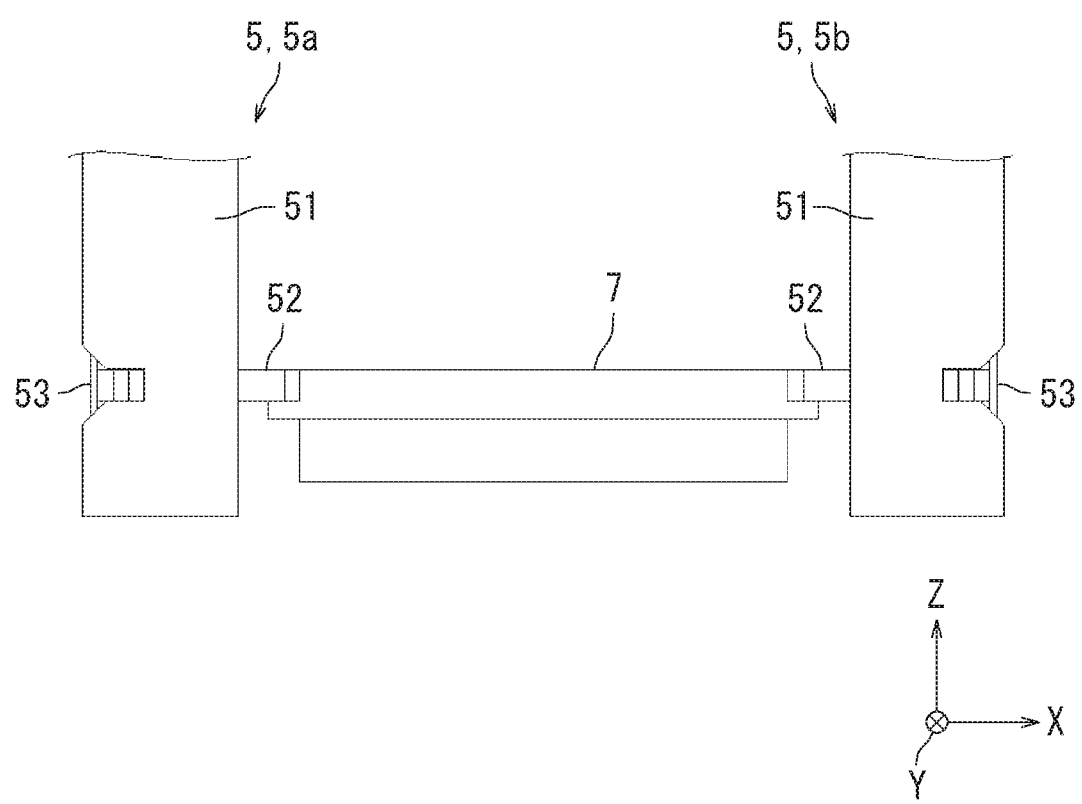
FIG. 9 is a partial enlarged view for describing the process of gripping the second connector.
Figure 10:
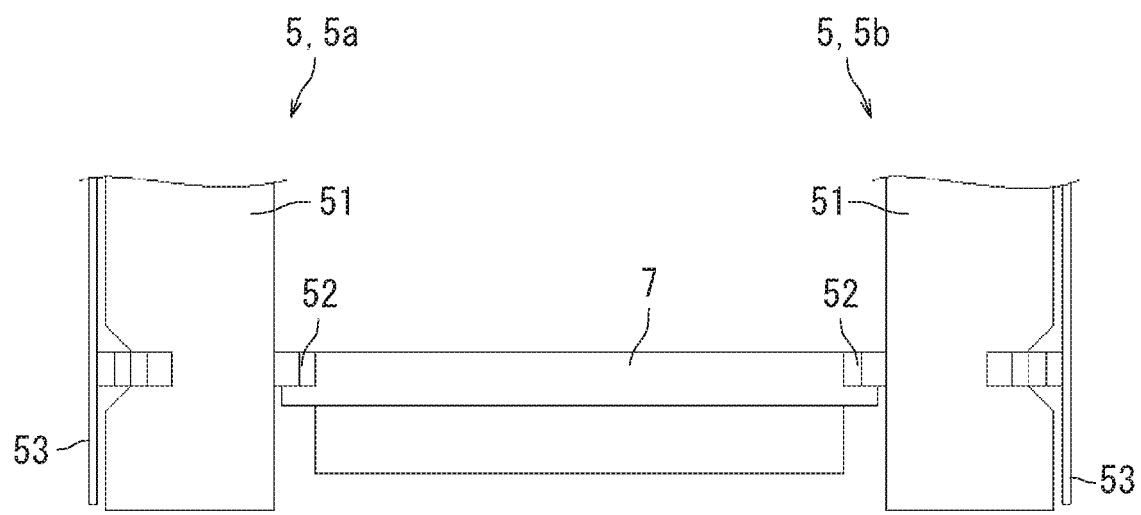
FIG. 10 is a partial enlarged view for describing the process of gripping the second connector.
Figure 10:
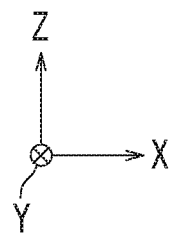

First, a process of gripping the second connector 7 is described with reference to FIGS. 8 to 10. FIG. 8 is a front view for describing the process through which the gripping section 5 grips the second connector 7. FIG. 9 is a partial enlarged view illustrating a state just before the gripping section 5 grips the second connector 7. FIG. 10 is a partial enlarged view of a state in which the gripping section 5 grips the second connector 7.

As illustrated in FIG. 8, the second connector 7 is fixed above a position determining member 8. The robot 1 illustrated in FIG. 1 causes the first gripping section 5a and the second gripping section 5b to descend toward the second connector 7 in a state in which the driving section 4 has widened the interval between the first gripping section 5a and the second gripping section 5b. The robot 1 suspends the descent of the first gripping section 5a and the second gripping section 5b when the height of the contact members 52 matches the height of an upper edge of the second connector 7. Thereafter, the driving section 4 narrows the interval between the first gripping section 5a and the second gripping section 5b.

As illustrated in FIG. 9, the two contact members 52 make contact with the second connector 7 from both sides of the second connector 7 just before the first gripping section 5a and the second gripping section 5b grip the second connector 7. Specifically the two chamfered portions 524 illustrated in FIG. 5A make contact with the end of the second connector 7 in the longitudinal direction. The two chamfered portions 524 serve to adjust positional shift.

As illustrated in FIG. 10, the driving section 4 further narrows the interval between the first gripping section 5a and the second gripping section 5b. The elastic members 53 receive force from the second connector 7 through the contact members 52 and bend. As a result, the second connector 7 receives force from the two elastic members 53 through the contact members 52 and is gripped. That is, in a first position of the first gripping section 5a and the second gripping section 5b illustrated in FIG. 10, the first gripping section 5a and the second gripping section 5b grip the second connector 7. The first position is a position in which the first gripping section 5a and the second gripping section 5b initially grip the second connector 7.

The spring strength of the two elastic members 53 is equal. Accordingly, in the first position of the first gripping section 5a and the second gripping section 5b, the two elastic members 53 exhibit an equal amount of elastic deformation. As a result, the center of the second connector 7 in the longitudinal direction matches the center between the first gripping section 5a and the second gripping section 5b.

Figure 11:
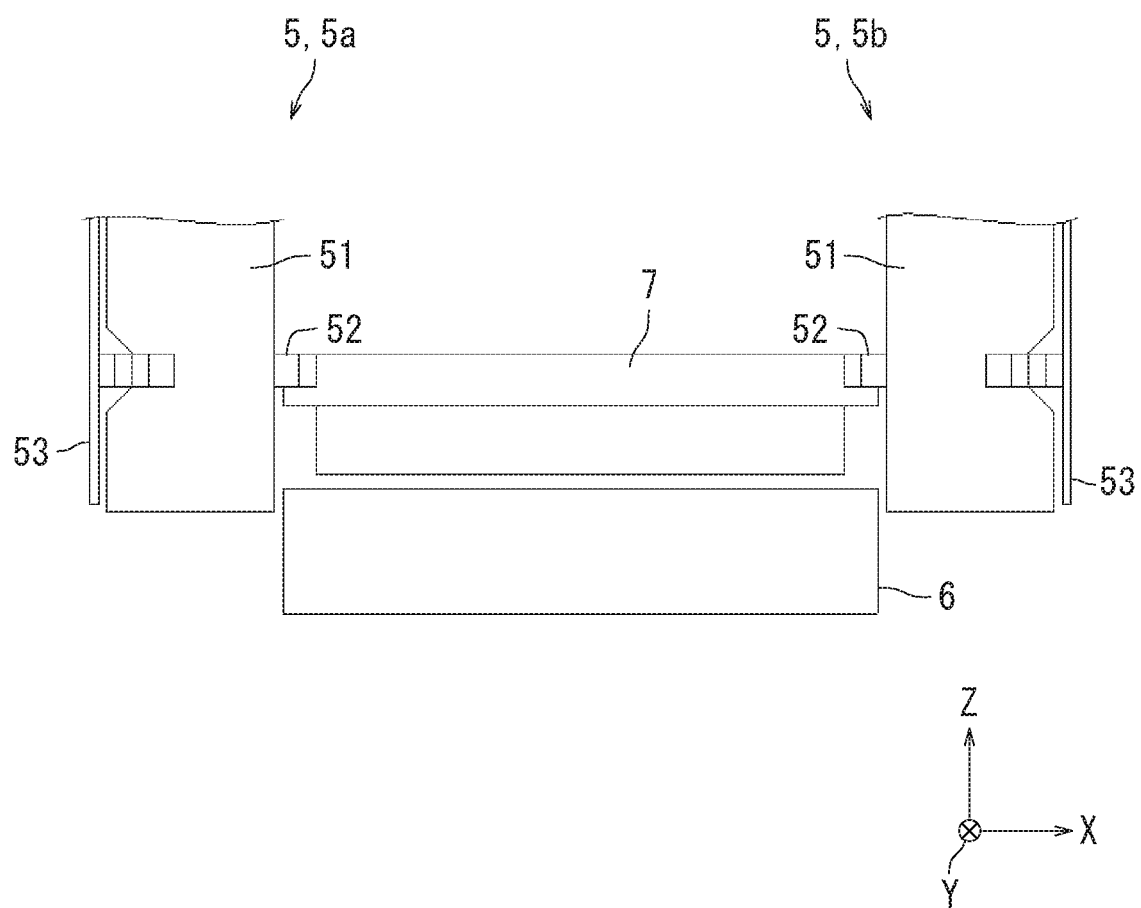
FIG. 11 is a partial enlarged view for describing a process of gripping a first connector.
Figure 12:
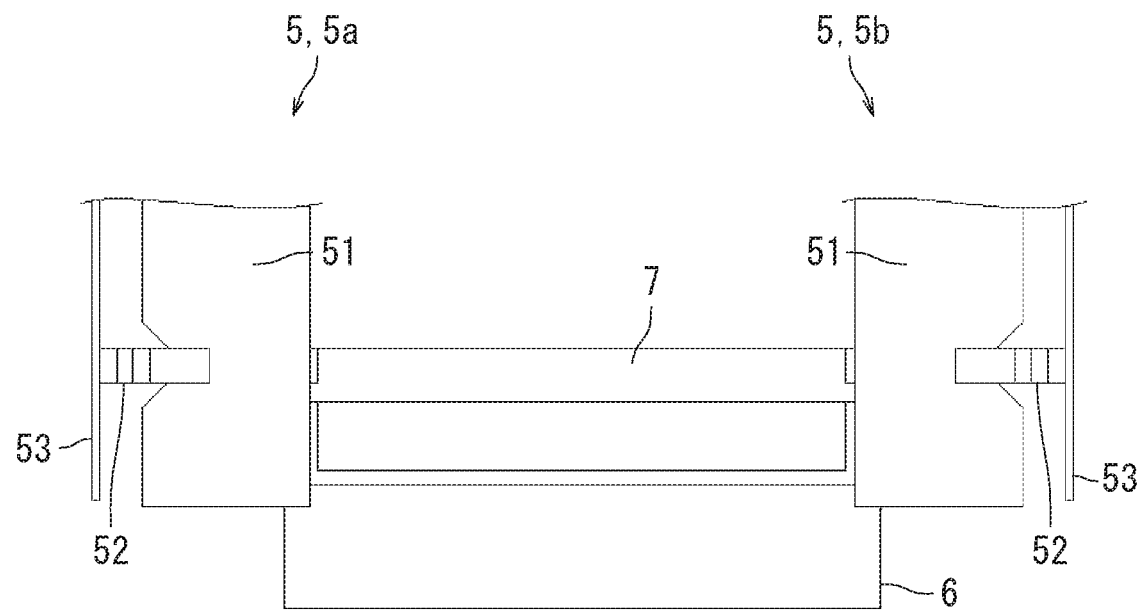
FIG. 12 is a partial enlarged view for describing the process of gripping the first connector.
Figure 13:
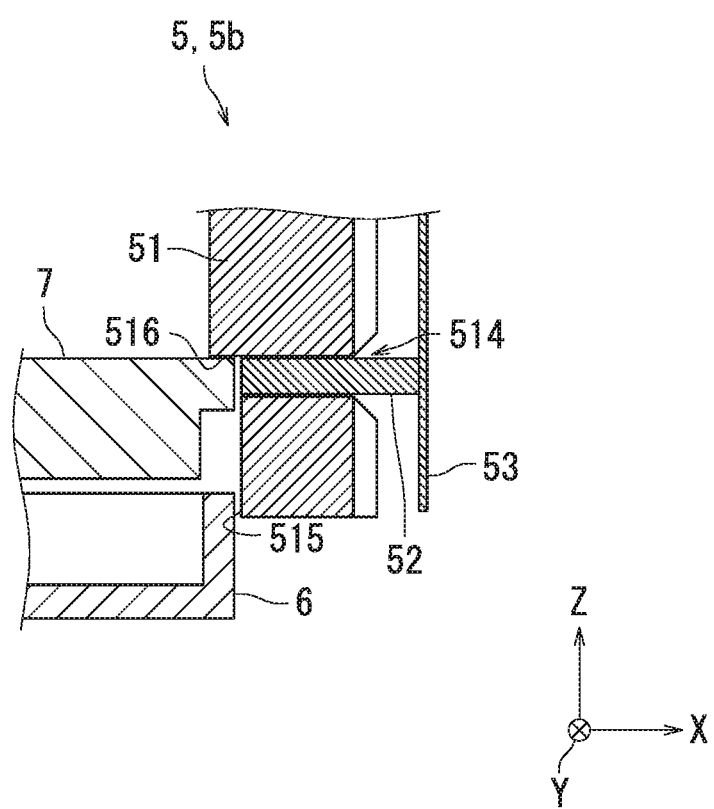
FIG. 13 is a vertical cross-sectional view of the second gripping section in FIG. 12.

Next, a process of gripping the first connector 6 is further described with reference to FIGS. 1 and 11 to 13. FIG. 11 is a partial enlarged view of a state just before the gripping section 5 grips the first connector 6. FIG. 12 is a partial enlarged view illustrating a state in which the gripping section 5 grips the first connector 6. FIG. 13 is a vertical cross-sectional view of the second gripping section 5b in FIG. 12.

As illustrated in FIG. 11, the robot 1 causes the first gripping section 5a and the second gripping section 5b to descend toward the first connector 6 in a state in which the driving section 4 keeps the first gripping section 5a and the second gripping section 5b in the first position. The robot 1 suspends the descent of the first gripping section 5a and the second gripping section 5b when lower edges of the support members 51 have become lower than an upper edge of the first connector 6. The first connector 6 is restricted from moving by an unillustrated member.

FIG. 11 illustrates a state when the descent of the first gripping section 5a and the second gripping section 5b is suspended, that is, a state just before the first gripping section 5a and the second gripping section 5b grip the first connector 6. Thereafter, the driving section 4 further narrows the interval between the first gripping section 5a and the second gripping section 5b. As a result, the first gripping section 5a and the second gripping section 5b reach a second position illustrated in FIGS. 12 and 13. The second position is a position in which the first gripping section 5a and the second gripping section 5b grip the first connector 6.

As illustrated in FIGS. 12 and 13, the two support members 51 grip the first connector 6 from both sides in the second position of the first gripping section 5a and the second gripping section 5b. Specifically, the two contact portions 515 grip the first connector 6 from both ends in the longitudinal direction. The elastic members 53 bend farther than in the first position. Also, the contact members 52 recede farther than in the first position. As a result, as illustrated in FIG. 13, an upper surface of an end of the second connector 7 gripped by the contact members 52 advances into the support members 51 until reaching the bottom of the stoppers 516.

In the second position of the first gripping section 5a and the second gripping section 5b, the two elastic members 53 exhibit an equal amount of elastic deformation. As a result, the center of the second connector 7 in the longitudinal direction matches the center between the first gripping section 5a and the second gripping section 5b. By contrast, the center of the first connector 6 in the longitudinal direction also matches the center between the first gripping section 5a and the second gripping section 5b. That is, the center of the first connector 6 in the longitudinal direction matches the center of the second connector 7 in the longitudinal direction.

The robot 1 causes the first gripping section 5a and the second gripping section 5b to further descend in a state in which the driving section 4 keeps the first gripping section 5a and the second gripping section 5b in the second position. By contrast, the first connector 6 is restricted from moving. As a result, the support members 51 and the second connector 7 descend together and the second connector 7 is inserted into the first connector 6 after the upper surface of the end of the second connector 7 has made contact with the stoppers 516. Meanwhile, the stoppers 516 restrict the second connector 7 from sliding in a direction which is opposite to a direction in which the second connector 7 is fitted in the first connector 6, and the first connector 6 slides on the contact portions 515. As such, the second connector 7 is fitted to the first connector 6.

Figure 14:
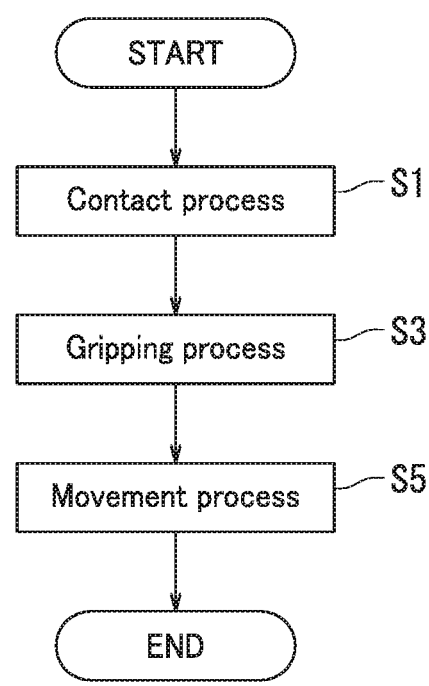
FIG. 14 is a flowchart depicting an example of a structure fabricating method according to the embodiment of the present disclosure.

Finally, a structure fabricating method according to the embodiment is described with reference to FIG. 14. FIG. 14 is a flowchart depicting an example of the structure fabricating method according to the embodiment.

As illustrated in FIG. 14, the structure fabricating method according to the embodiment is a method through which a structure is fabricated by assembling the first connector 6 and the second connector 7, and includes a contact process S1, a gripping process S3, and a movement process S5.

In the contact process S1, the first and second gripping sections 5a and 5b including the contact members 52 and the elastic members 53 are driven. As a result, the contact members 52 of the first and second gripping sections 5a and 5b make contact with the second connector 7.

In the gripping process S3, the first and second gripping sections 5a and 5b grip the second connector 7 through the elastic members 53 of the first and second gripping sections 5a and 5b urging the contact members 52.

In the movement process S5, the first and second gripping sections 5a and 5b are moved such that the first connector 6 and the second connector 7 are assembled.

According to the assembly apparatus 100 and the structure fabricating method of the embodiment, the first connector 6 and the second connector 7 can be assembled at low cost.

The above description is of an ideal embodiment of the present disclosure, and may thus contain various favorable technical limitations. However, the technical scope of the present disclosure is not limited to these aspects unless specific limitations to the present disclosure are noted. That is, elements of configuration in the above embodiment may be appropriately replaced with existing elements of configuration and the like, and a number of variations including combinations with other existing elements of configuration are possible. The description of the above embodiment does not limit the content of the disclosure recited in the scope of the claims.

(1) As described with reference to FIG. 1, the operational result of the assembly apparatus 100 is "fitting" of a connector in the embodiment of the present disclosure. However, the present disclosure is not limited as such. For example, other operational results such as "engagement" or "installation" may be achieved.

(2) As described with reference to FIG. 1, the "member" which is a subject of assembly is a "connector" in the embodiment of the present disclosure. However, the present disclosure is not limited as such. For example, a "machine component such as a screw" or an "electronic component as a generic concept" may be a subject of assembly.

(3) As described with reference to FIG. 12, the number of members which perform simultaneous gripping is two in the embodiment of the present disclosure. However, the present disclosure is not limited as such. The number of members which perform simultaneous gripping may be three or more.

(4) As described with reference to FIGS. 3 and 4, the first gripping section 5a and the second gripping section 5b each include the elastic member 53 in the embodiment of the present disclosure. However, the present disclosure is not limited as such. A configuration not including the elastic member 53 is also possible in order to simultaneously grip a plurality of members.

What is claimed is:

1. An assembly apparatus for assembling a first member and a second member, the assembly apparatus comprising:
   a first gripping section including a first contact member and a first elastic member;
   a second gripping section including a second contact member and a second elastic member; and
   a driving section configured to drive the first gripping section and the second gripping section, wherein
   the driving section drives the first gripping section and the second gripping section such that the first contact member and the second contact member make contact with the second member,
   the first gripping section and the second gripping section grip the second member through the first elastic member urging the first contact member and the second elastic member urging the second contact member, and
   the driving section drives the first gripping section and the second gripping section such that the first member and the second member are assembled.

2. The assembly apparatus according to claim 1, wherein
   the first gripping section and the second gripping section grip the first member, and
   the driving section drives the first gripping section and the second gripping section such that the first member and the second member are assembled.

3. The assembly apparatus according to claim 1, wherein
   the first gripping section further includes a first restricting portion which restricts the second member from sliding in a first direction,
   the second gripping section further includes a second restricting portion which restricts the second member from sliding in the first direction, and
   the driving section drives the first gripping section and the second gripping section toward the first member in a second direction which is opposite to the first direction so as to fit the first member and the second member together.

4. The assembly apparatus according to claim 1, wherein
   the first gripping section has a first contact portion,
   the second gripping section has a second contact portion, and
   the first gripping section and the second gripping section grip the first member through the driving section driving the first gripping section and the second gripping section such that the first contact portion and the second contact portion make contact with the first member.

5. The assembly apparatus according to claim 1, wherein
   the first gripping section has a first contact portion on a side in a second direction of the first contact member,
   the second gripping section has a second contact portion on a side of the second direction the second contact member,
   the first gripping section and the second gripping section grip the second member through the driving section driving the first gripping section and the second gripping section such that the first contact member and the second contact member make contact with the second member, and
   the first gripping section and the second gripping section grip the first member through the driving section driving the first gripping section and the second gripping section such that the first contact portion and the second contact portion make contact with the first member.

6. The assembly apparatus according to claim 1, wherein
   urging force of the first elastic member against the first contact member is equal to urging force of the second elastic member against the second contact member.

7. The assembly apparatus according to claim 1, wherein
   the first contact member has a first recess,
   the second contact member has a second recess, and
   the first recess and the second recess make contact with the second member.

8. The assembly apparatus according to claim 1, wherein
   the first contact member has a first projection,
   the second contact member has a second projection, and
   the first projection and the second projection make contact with the second member.

9. An assembly apparatus for assembling a plurality of members including a first member and a second member, the assembly apparatus comprising:
   a first gripping section including a first contact member;
   a second gripping section including a second contact member; and
   a driving section configured to drive the first gripping section and the second gripping section, wherein
   the first gripping section and the second gripping section grip the second member through the driving section driving the first gripping section and the second gripping section such that the first contact member and the second contact member make contact with the second member,
   the first gripping section and the second gripping section grip the first member, and
   the driving section drives the first gripping section and the second gripping section such that the first member and the second member are assembled.

10. A structure fabricating method through which a structure is fabricated by assembling a first member and a second member, the method comprising:
    making contact of a first contact member and a second contact member with the second member through driving of a first gripping section and a second gripping section, the first gripping section including the first contact member and a first elastic member, the second gripping section including the second contact member and a second elastic member;
    gripping the second member with the first gripping section and the second gripping section through the first elastic member urging the first contact member and the second elastic member urging the second contact member, and moving the first gripping section and the second gripping section such that the first member and the second member are assembled.

* * * * *